United States Patent
Meeks et al.

(10) Patent No.: US 6,176,674 B1
(45) Date of Patent: *Jan. 23, 2001

(54) APPARATUS FOR LOADING AND TRANSPORTING A TRAILER ON A PICKUP TRUCK AND METHOD

(76) Inventors: T. Wayne Meeks; Dixie M. Meeks, both of P.O. Box 1115, Seneca, SC (US) 29679

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/724,658

(22) Filed: Oct. 1, 1996

Related U.S. Application Data

(63) Continuation-in-part of application No. 08/497,879, filed on Jul. 3, 1995, now abandoned.

(51) Int. Cl.[7] ....................................................... B60P 3/06
(52) U.S. Cl. .......................... 414/538; 414/462; 414/494; 414/500; 414/813
(58) Field of Search ..................................... 414/462, 530, 414/538, 559, 494, 500, 812, 813

(56) References Cited

U.S. PATENT DOCUMENTS

| | | | | |
|---|---|---|---|---|
| 3,648,866 | * | 3/1972 | Slown ................................... | 414/462 |
| 3,734,321 | * | 5/1973 | Long et al. .......................... | 414/462 |
| 3,843,002 | * | 10/1974 | Pihlgren .............................. | 414/462 |
| 3,900,118 | * | 8/1975 | Kellogg ............................... | 414/530 |
| 4,274,788 | * | 6/1981 | Sutton ................................. | 414/462 |
| 5,069,595 | * | 12/1991 | Smith et al. ........................ | 414/462 |
| 5,108,248 | * | 4/1992 | Murrill ................................. | 414/462 |
| 5,609,462 | * | 3/1997 | Reimer ................................ | 414/462 |
| 5,921,741 | * | 7/1999 | Heimgartner ....................... | 414/462 |

* cited by examiner

Primary Examiner—James W. Keenan
(74) Attorney, Agent, or Firm—Ralph Bailey, P.A.

(57) ABSTRACT

Apparatus and method for loading a vehicle having a cab and a carrying compartment includes a frame (A) within the carrying compartment having an upright support member (B) on the frame carrying a power operated winch (C) for positioning a wheeled trailer upon spaced tracks (D) which further includes a guide member (E) carried between the tracks for carrying the trailer and the load in the trailer upon the vehicle and cab and carrying compartment. A substantially U-shaped frame includes torsion bars (F) for supporting tracks carrying the wheels of a trailer and for providing a guiding and locking mechanism (G) for positioning the trailer for transport.

12 Claims, 9 Drawing Sheets

APPARATUS FOR LOADING AND TRANSPORTING A TRAILER ON A PICKUP TRUCK AND METHOD

This is a Continuation-in-Part of our U.S. application Ser. No. 08/497,879, filed Jul. 3, 1995, now abandoned.

BACKGROUND OF THE INVENTION

This invention relates to apparatus and method for loading a vehicle having a cab employing a U-shaped frame carrying a winch and related apparatus forwardly in a carrying compartment which is especially useful for positioning a wheeled trailer on tracks above the carrying compartment wherein sides of the carrying compartment are partially isolated from road shocks and the trailer is fixed for transport without interfering with free access to the carrying compartment.

Wheeled trailers, for example, are customarily towed behind a pickup truck or other apparatus having a cab and a carrying compartment often utilizing a ball and socket hitch. The towing of the wheeled trailer precludes the towing of another vehicle such as a camper and the like because of the inability to properly tow more than one articulated vehicle utilizing ball and socket hitches and the like. Thus, if a camper as well as a boat and trailer are to be transported to a camping site it is necessary to utilize two vehicles, one for towing the boat and trailer and the other for towing the camper. The problem of loading pickup trucks has been addressed in the past, for example, wherein a boom carrying a power operated winch is illustrated in U.S. Pat. No. 4,265,585. An example of utilizing trackways for loading vehicles is illustrated in U.S. Pat. No. 4,655,671. U.S. Pat. No. 5,069,595 discloses a rigid frame carried by sides of a carrying compartment and utilizing a fixed guide rail extending centrally longitudinally of the carrying compartment for guiding a winch cable with trailer attached.

This invention deals with the problem of effectively facilitating the loading of bulky objects for transport on a pickup truck and the like. The difficulties of towing two wheeled loads as by a pickup truck is avoided by the provision of improved apparatus and method for loading and positioning a wheeled trailer on the pickup truck for transport leaving a towing hitch carried thereby free for towing a camper and the like.

SUMMARY OF THE INVENTION

Accordingly, it is an important object of this invention to provide a winch and related apparatus for loading a vehicle having a cab and a carrying compartment wherein a transverse frame is positioned forwardly within the carrying compartment so as to support a power operated winch on an upright support member. A rotatable guide member carried rearwardly thereof as by the tailgate may be utilized therewith.

Another important object of the invention is the provision of a winch with related apparatus for loading a wheeled trailer onto a vehicle having a cab and a carrying compartment utilizing a pair of trackways supported by the carrying compartment for positioning the wheeled trailer and its load in raised position above the carrying compartment and the cab.

Another important object of the invention is the provision of a winch for loading a wheeled trailer carrying a boat for recreational use utilizing a frame within the compartment for supporting a power operated winch while positioning a rotatable guide member on a lowered tailgate between a pair of tracks positioned upon the frame for supporting a trailer and its contents.

Another important object of the invention is the provision of a winch operated apparatus for use in a vehicle having a cab and a carrying compartment utilizing a frame and removable support or standard for carrying a power operated winch within the carrying compartment for utilizing a rotatable guide member carried between track members adjustably carried by a rearwardly positioned frame for loading bulky contents into the carrying compartment of the vehicle.

Still another important object of the invention is the provision of an intermediate rotatable member for guiding a forward portion of a wheeled vehicle for sequentially elevating the wheeled trailer to a position as upon spaced tracks carried above the carrying compartment of a vehicle.

Another important object of the invention is to provide a U-shaped flexible frame structure for carrying a mast supporting a front part of the trailer above the cab and adjustable tracks carrying trailer wheels above the carrying compartment in such a way as to isolate the sides of the carrying compartment from road shocks as result from uneven pavement and surfaces and sudden stopping and starting and the like.

Still another important object of the invention is to provide an upright support for lifting trailer and load which may be readily positioned above the carrying compartment of a pickup truck in such a way to automatically positively position the trailer while avoiding the use of cross members as would limit access to the carrying compartment.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The drawings illustrate winch apparatus for use on a vehicle having a cab and a carrying compartment. A frame A is mounted within the carrying compartment. A support member B is mounted forwardly within the carrying compartment on the frame. A power operated winch C is carried by the support member. A pair of transversely spaced tracks D are carried by the frame and aligned at a level for positioning a wheeled trailer extending over a top of the cab. A rotatable guide member E is carried intermediate the tracks for guiding a forward portion of the wheeled trailer upwardly when positioning wheels of the trailer upon the tracks. Thus, a trailer and its contents may be positioned above the carrying compartment thereby permitting attachment of a second wheeled trailer in position for towing while utilizing the space within the carrying compartment for other purposes.

Figure 1:
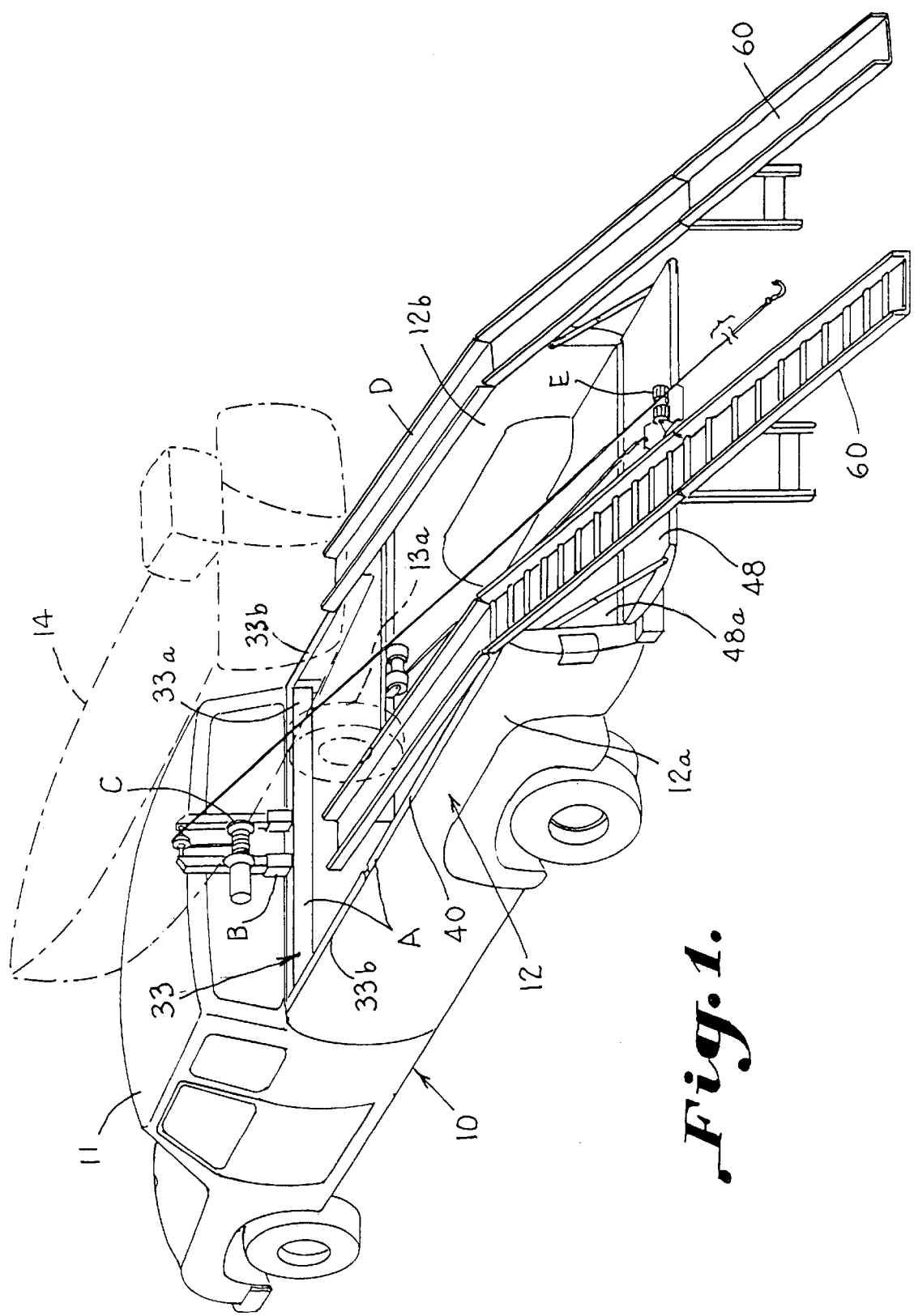
FIG. 1 is a perspective view illustrating a winch operated loading apparatus constructed in accordance with the invention with a trailer and boat in broken lines in an almost fully loaded position above the cab and carrying compartment of a pickup truck.

Referring more particularly to FIG. 1, a pickup truck is broadly designated at 10. The pickup truck has a cab 11, and carrying compartment broadly designated at 12. A wheeled trailer is broadly designated as at 13 in FIG. 2. The wheeled trailer is illustrated as carrying a boat 14 which is secured in position thereon by a suitable manually operated winch mechanism broadly designated as at 15 in FIG. 4. The winch 15 is manually operated by the crank 16 and is carried by an upright member 17 on the forward frame or tongue portion 18 of the trailer. A rotatable member 19 is carried by the upright member 17 for positioning the forward end of the boat as the winch cable 20 is drawn by turning of the crank 16.

Figure 2:
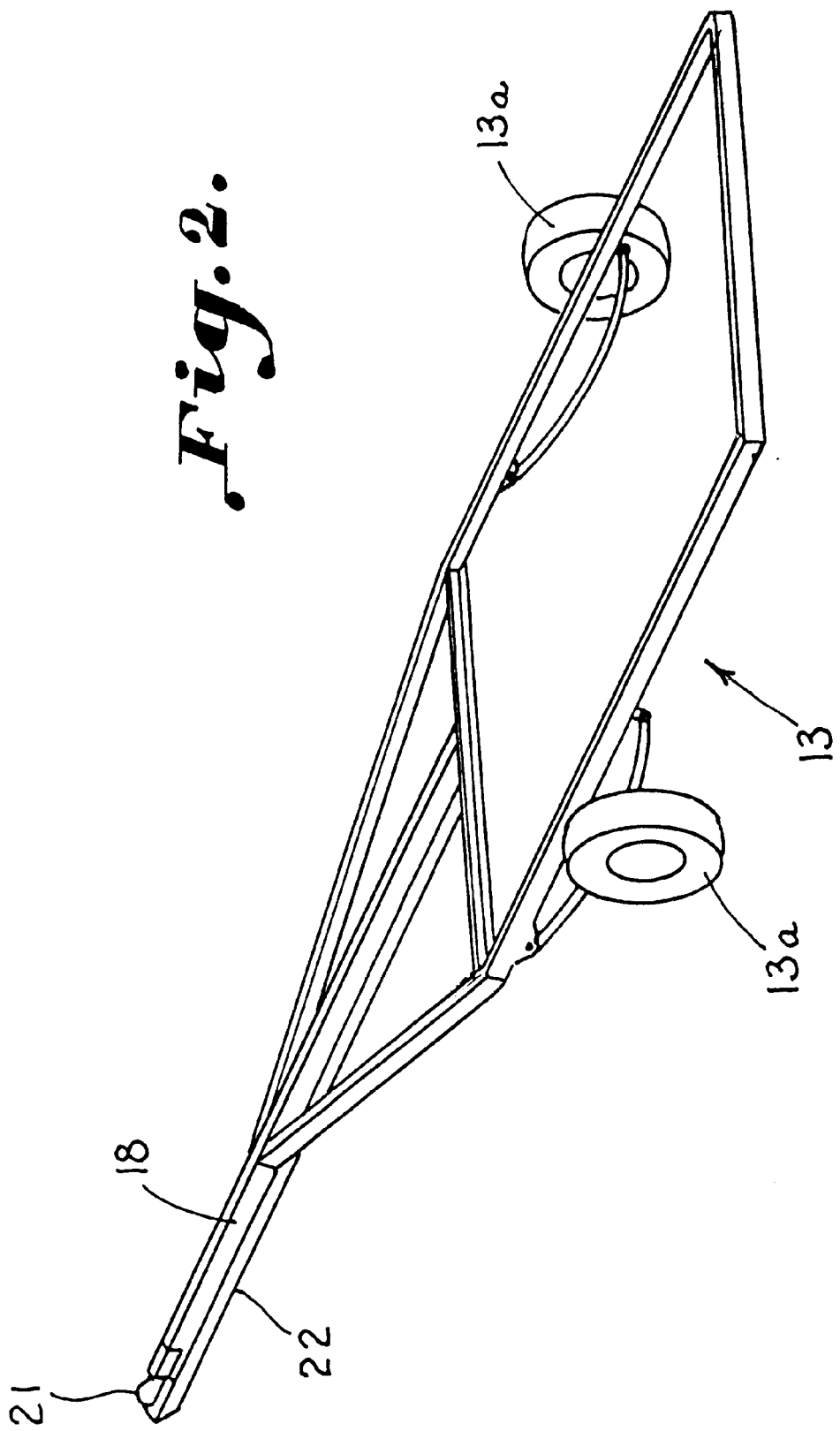
FIG. 2 is a perspective view illustrating a wheeled trailer for a boat and the like for towing by a ball and socket hitch with the addition of a trailer guide and fastener for securement of the winch cable and for guiding the trailer over rotatable guide members for use during a loading and positioning operation in accordance with the invention.
Figure 3:
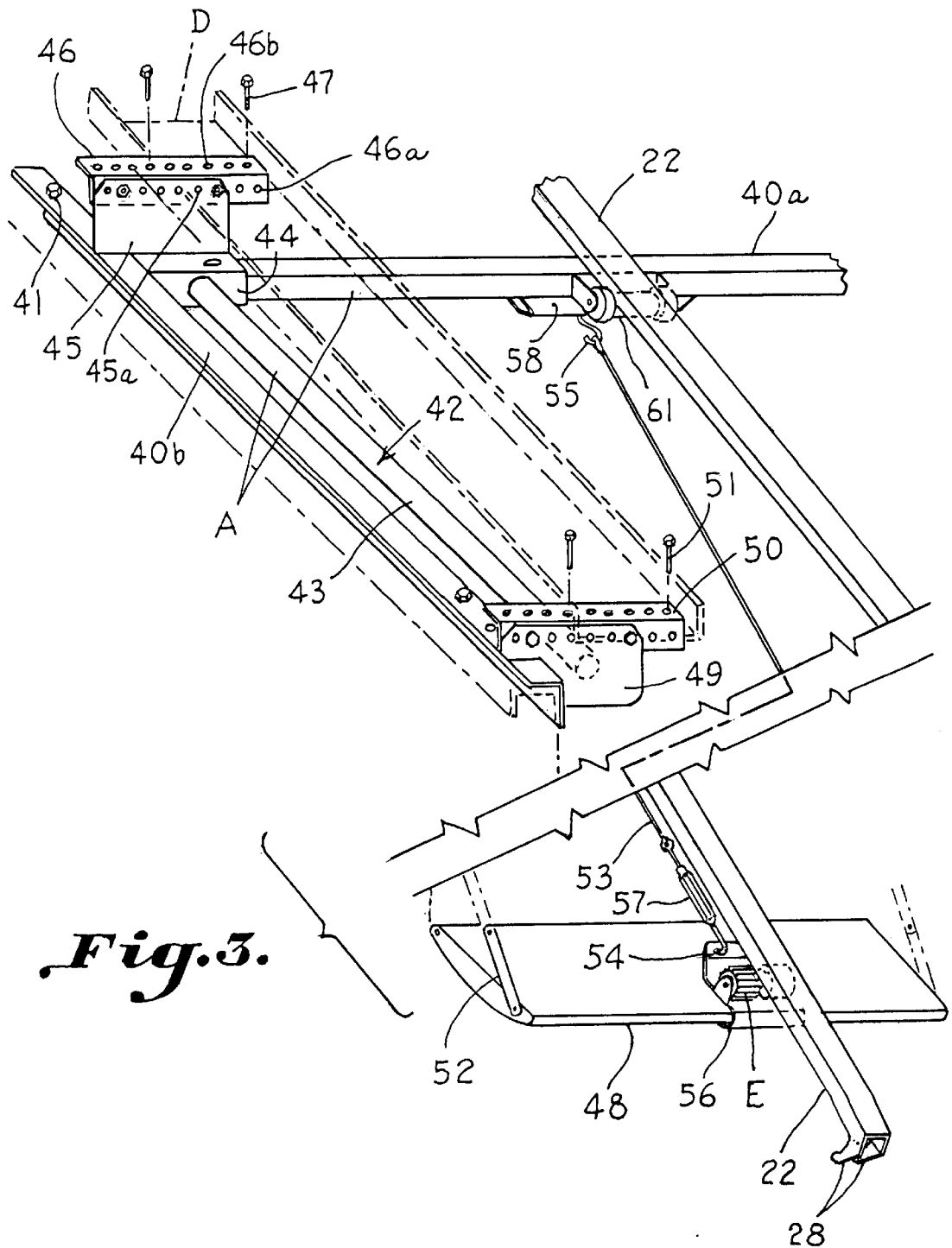
FIG. 3 is a perspective view, with parts omitted for purposes of clarity, illustrating first and second rotatable guide members for sequentially guiding and positioning the trailer as it is raised upon the carrying compartment together with transversely adjustable frames for positioning spaced tracks for accommodating and positioning the wheels of the trailer.
Figure 4:
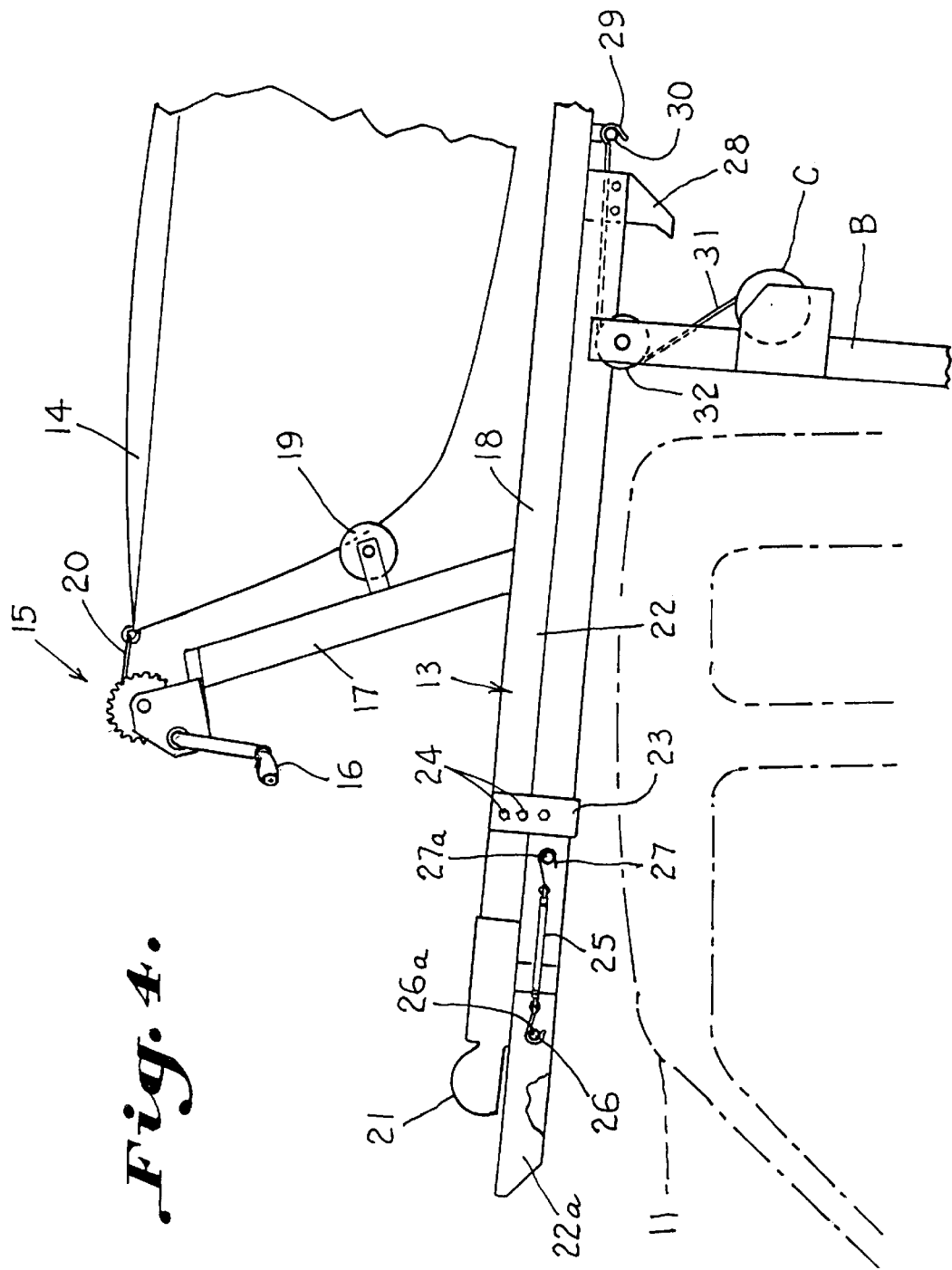
FIG. 4 is a side elevation illustrating a trailer and boat in fully loaded position with securement by the winch and illustrating connecting means for securing the winch and modifying the tongue of the trailer for guidance during loading and positioning.

Referring more particularly to FIGS. 2 and 4, it will be noted that the forward end of the tongue 18 is provided with a socket member 21 for serving as a hitch receiving a ball (not shown) fixedly mounted centrally upon a bumper of the pickup truck 10. A trailer guide track 22 is positioned beneath the tongue 18 of the trailer and is secured thereto as by means of a strap 23 which may be fastened with suitable bolts 24. The trailer guide track 22 has an auxiliary track member 22a carried forwardly thereof and is secured as by an elastic strap 25 having hooks 26 and 27 at respective ends for securement to pins 26a and 27a. Adjacent the other end of the trailer guide track a stop is illustrated as including a bracket member 28. In lieu of the bracket 28 (FIGS. 3 and 4) a pin 28a (FIG. 9) extending across the legs of track 22 may be provided to engage recesses in bracket members 70 to stop forward movement of the trailer. The track member 22 and the auxiliary member 22a are inverted channel members open at the bottom (FIGS. 3 and 4) permitting a cable carrying a hook 29 to pass therethrough for attachment to the pin 30 carried by the guide track member 22 for loading and for securing the boat carrying trailer in position loaded upon the vehicle.

Referring more particularly to FIG. 4, a winch cable is illustrated at 31 as being manipulated by the power operated winch C which is carried upon the support member B for guiding the cable over a sheave 32 which acts as a second rotatable guide and is received by the guide track member for securing the boat carrying trailer in position upon the vehicle (FIG. 4).

Figure 6:
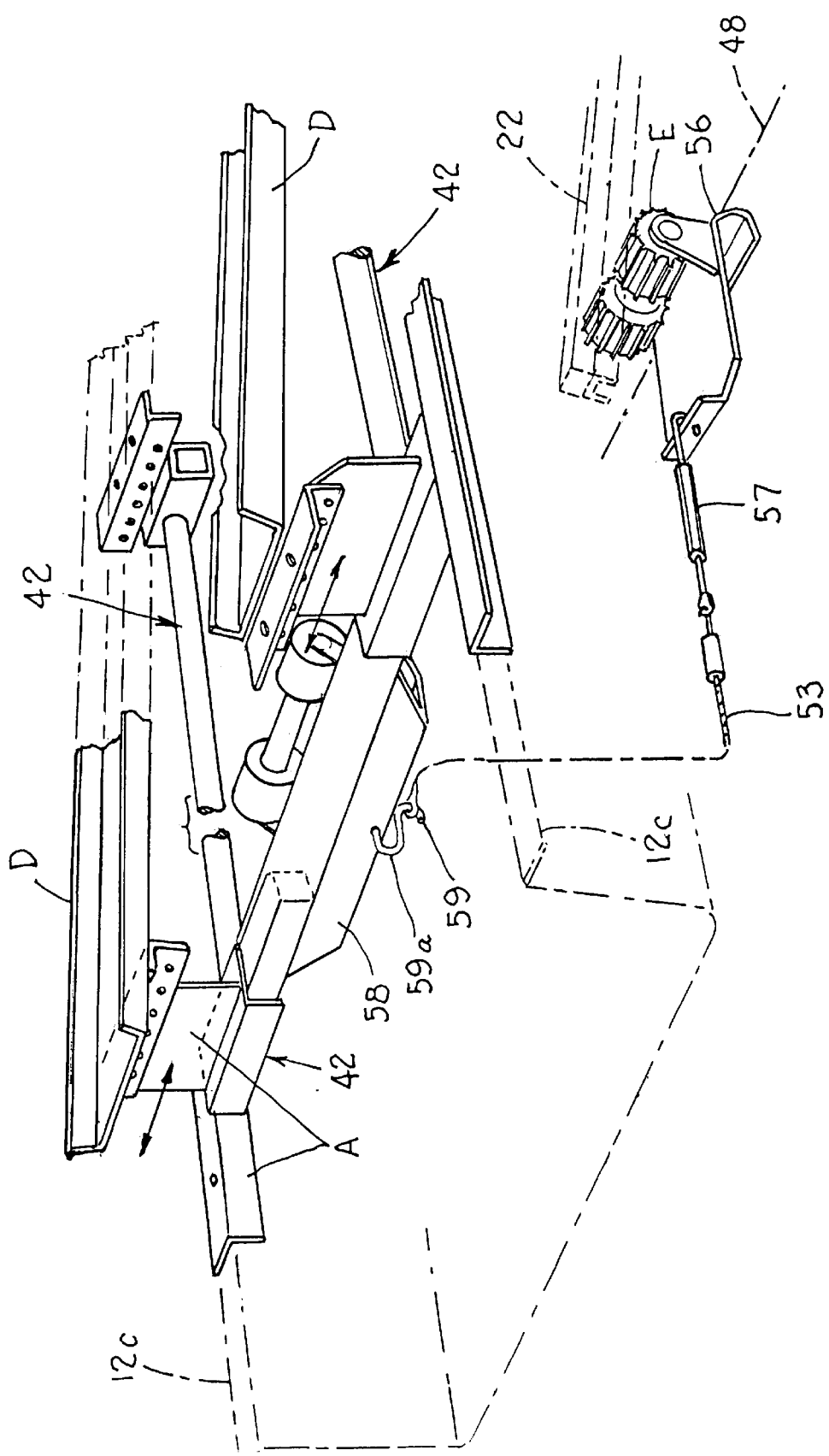
FIG. 6 is a perspective view, with parts omitted, illustrating adjustable frame members positioning the tracks upon the carrying compartment for transverse width adjustment together with cable attaching means for suitable securement of a rotatable guide member upon a tailgate in lowered position.

The frame A is illustrated in FIGS. 1, 3 and 6 as being mounted within the carrying compartment 12 and as having a forward portion 33 for carrying the support member B thereon.

The forward portion of the frame 33 includes a transverse horizontal support member 33a together with rearward extensions 33b welded adjacent each end thereto. The extensions 33b are angle members having legs overlying inturned upper flanges 12c of the sides of the carrying compartment 12.

Figure 5:
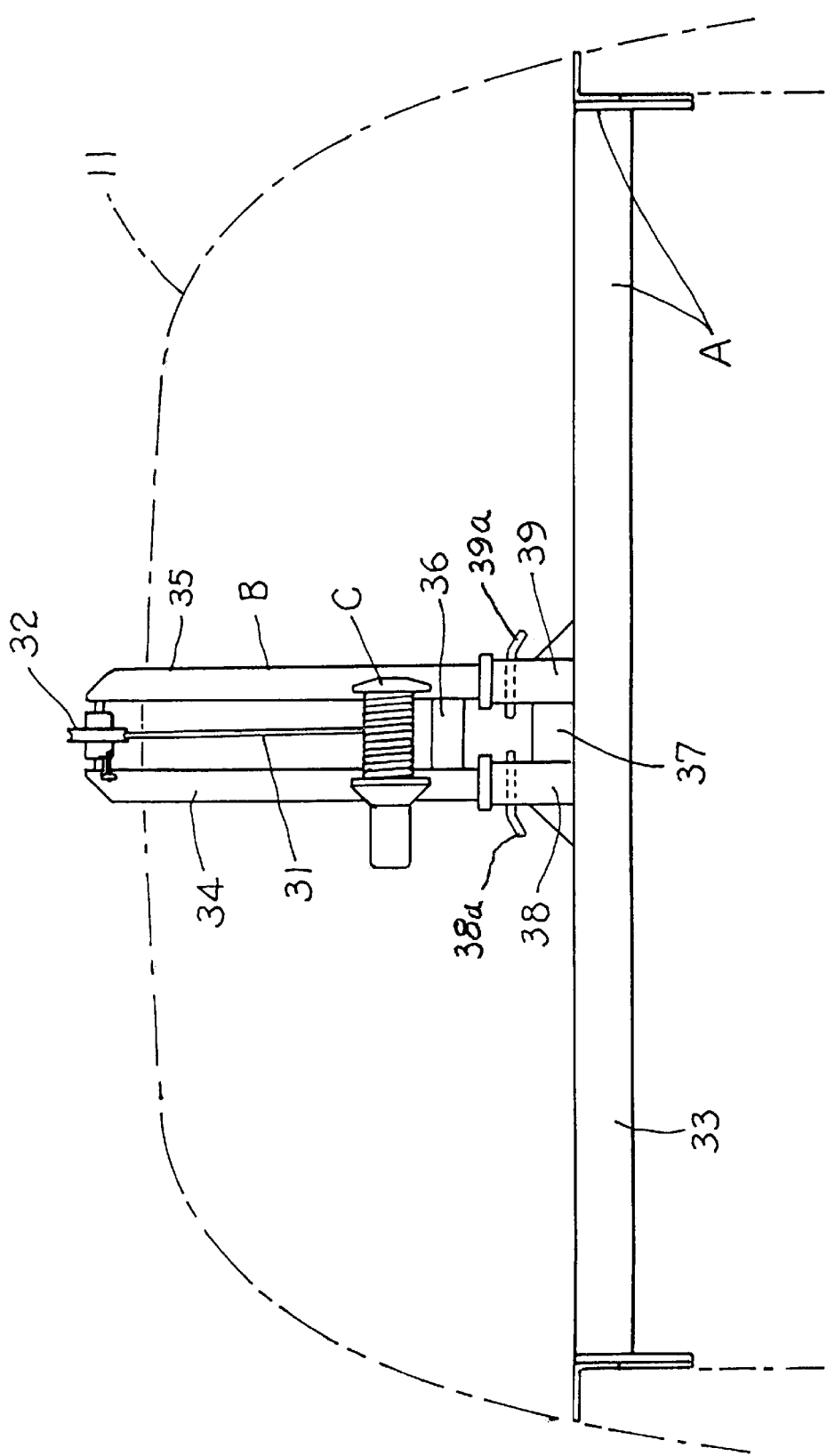
FIG. 5 is a transverse sectional elevation illustrating the frame and mounting means for a power operated winch.

The support member B is best shown in FIGS. 1 and 5 and includes a pair of spaced upright members 34 and 35 which are bridged for rigid securement by member 36. A suitable support 37 rigidly secures spaced open tubing members 38 and 39 upon the forward transverse frame member 33. The upright members 34 and 35 are received in the tubular supports 38 and 39, respectively, for fastening as by suitable pins and carry suitable power operated winch mechanism therebetween. The winch includes the cable 31 which passes over the sheave 32 for securement to the pin 29 carried adjacent the forward end of the trailer frame member or tongue 18. The frame A includes a rear portion 40 including angles 40b extending above the flanges 12c (FIG. 6) of the sides 12a and 12b of the carrying compartment. The rear frame member 40 includes a transverse frame member 40a, together with spaced longitudinal frame members, including angle members 40b. The frame member 40 is suitably secured as by bolts 41 to the respective side members 12a and 12b of the carrying compartment. The side frame members 40b are angle members having an upper leg overlying the respective sides 12a and 12b. The rear frame 40 carries transversely spaced supports broadly designated at 42 in FIGS. 3 and 6. The spaced supports 42 carry the tracks D and each includes a longitudinal transversely spaced bar 43 carrying a sliding bracket 44 on a forward end having an upright mounting plate 45 which positions a horizontal angle 46. The mounting plate 45 has spaced holes 45a for adjustment in respect to horizontally spaced holes 46a carried by the angle 46. A number of spaced holes 46b are carried for securement as by the bolts 47 in suitably spaced openings within the tracks D. A forward end of the tracks adjacent the tailgate 48, carried rearwardly of the bed 48a, is illustrated as being secured in respect to a vertical mounting plate 49 for positioning the horizontal angle mounting bar 50 for securement as by bolts 51 to corresponding bolts (not shown) in the rearward end of the tracks.

In operation, the tailgate 48 is lowered and partially supported by suitable linkage 52 at each end. Supplemental support is provided by means of a cable 53 which preferably has suitable hooks 54, 55 at respective ends for attachment to a first rotatable guide member E illustrated as including a bracket 56 secured on one end to an outer edge of the tailgate and having a turnbuckle 57 providing adjustment to the cable 53. The hook 55 on the other end of the cable is attached to a bracket 58 having an anchor 59 carried by the transverse frame member 40a. An additional anchor 59a may be provided for securement of an additional cable (not shown) for fixing the forward end of the trailer for transport. The wheels 13a (FIGS. 1 and 2) are guided into the channel members which form the tracks D and which have been adjusted to a proper transverse spacing to accommodate the wheels. The tracks D are provided with auxiliary rearwardly and downwardly inclined track members 60 forming a ramp for guiding the respective wheels of the trailer upwardly toward the carrying compartment and the tracks D carried thereon.

Referring to FIG. 3, which is a stage drawing, the track 22 engages the first rotatable guide member E which is illustrated as being carried by the bracket 56 on the tailgate 48. The next position of the trailer guide track 22 is illustrated in broken lines as passing over the rotatable support 61 which is carried by the transverse frame member 40a. The trailer and the boat are then placed in fully raised position as shown in FIG. 4 with the adjustable stop member 28 carried rearwardly of the vertical support B and with the winch in locked position. The tongue 18 and the track which is carried therebeneath extends over the top of the cab 11. By removing the auxiliary member 22a the socket 21 will be unobstructed to receive the ball carried by the bumper of a towing vehicle without the necessity of removing the guide track 22 which receives the sheave 32 between its inverted legs.

Figure 7:
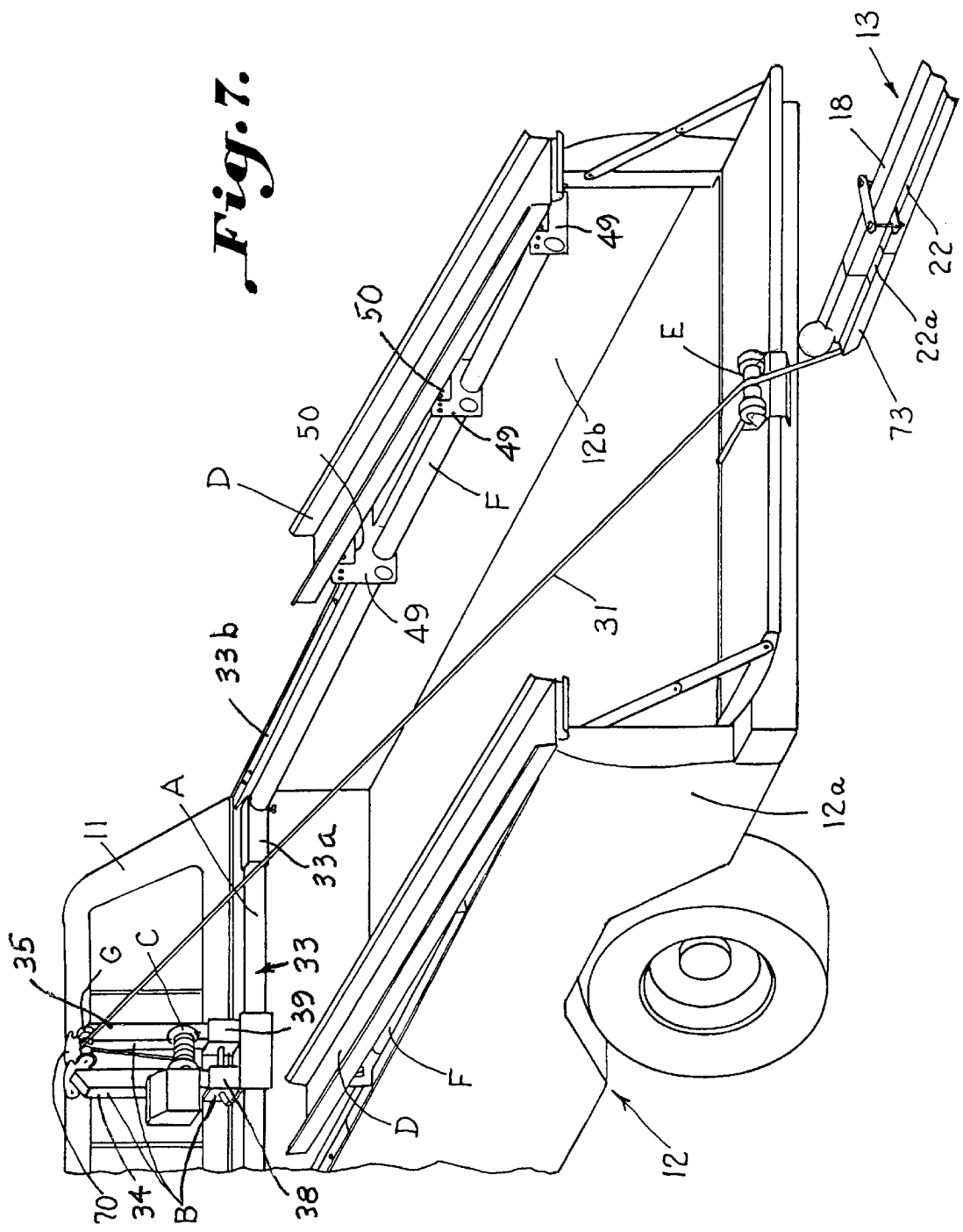
FIG. 7 is a perspective view illustrating a flexible frame including torsion bars for positioning an elongated trailer and its contents above the carrying compartment as well as winching apparatus for guiding the trailer and its contents into position for locking and transport.
Figure 8:
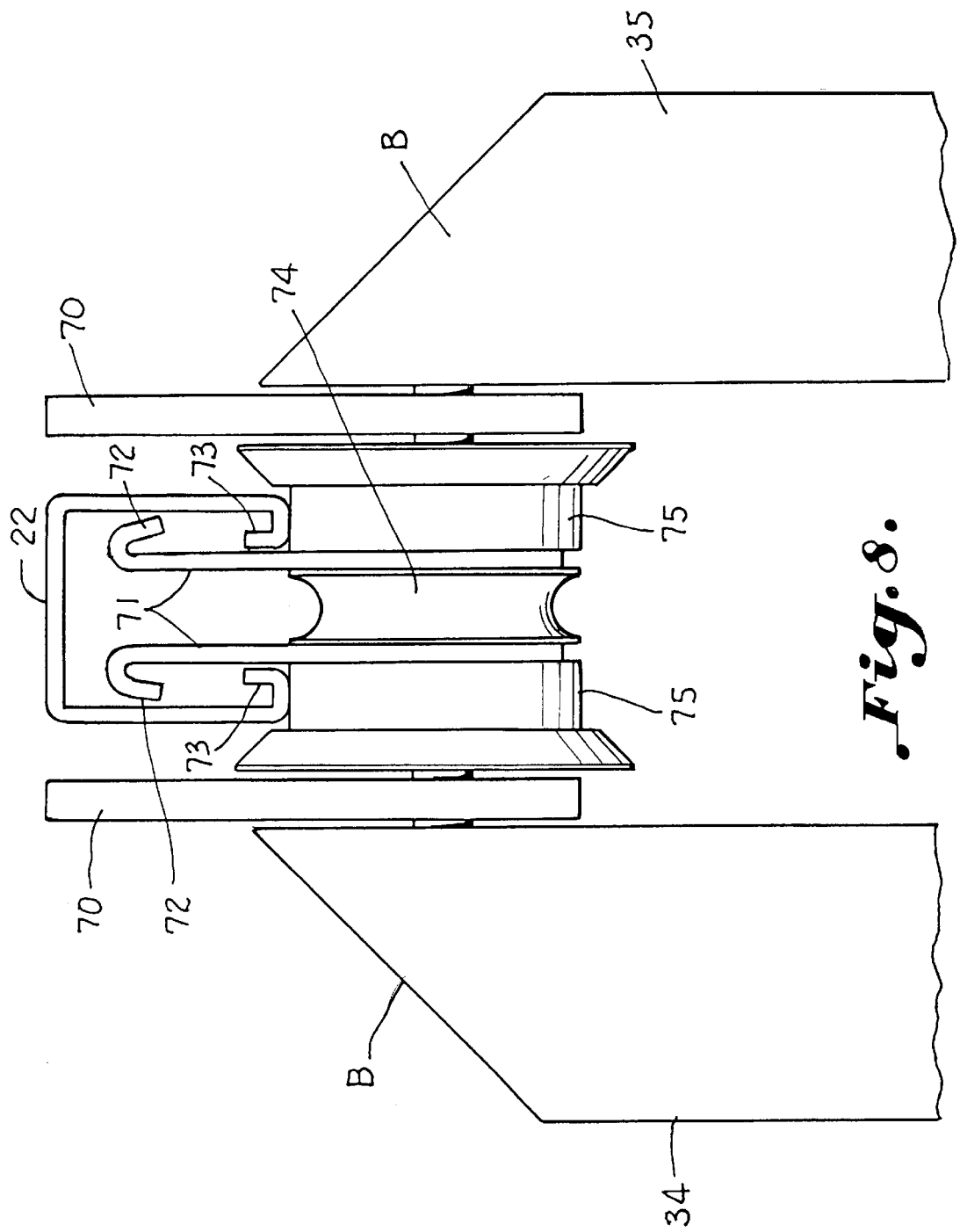
FIG. 8 is an enlarged schematic front elevation of a top of a mast carrying a rocker arm for guiding and positively locking the trailer in position for transport.
Figure 9:
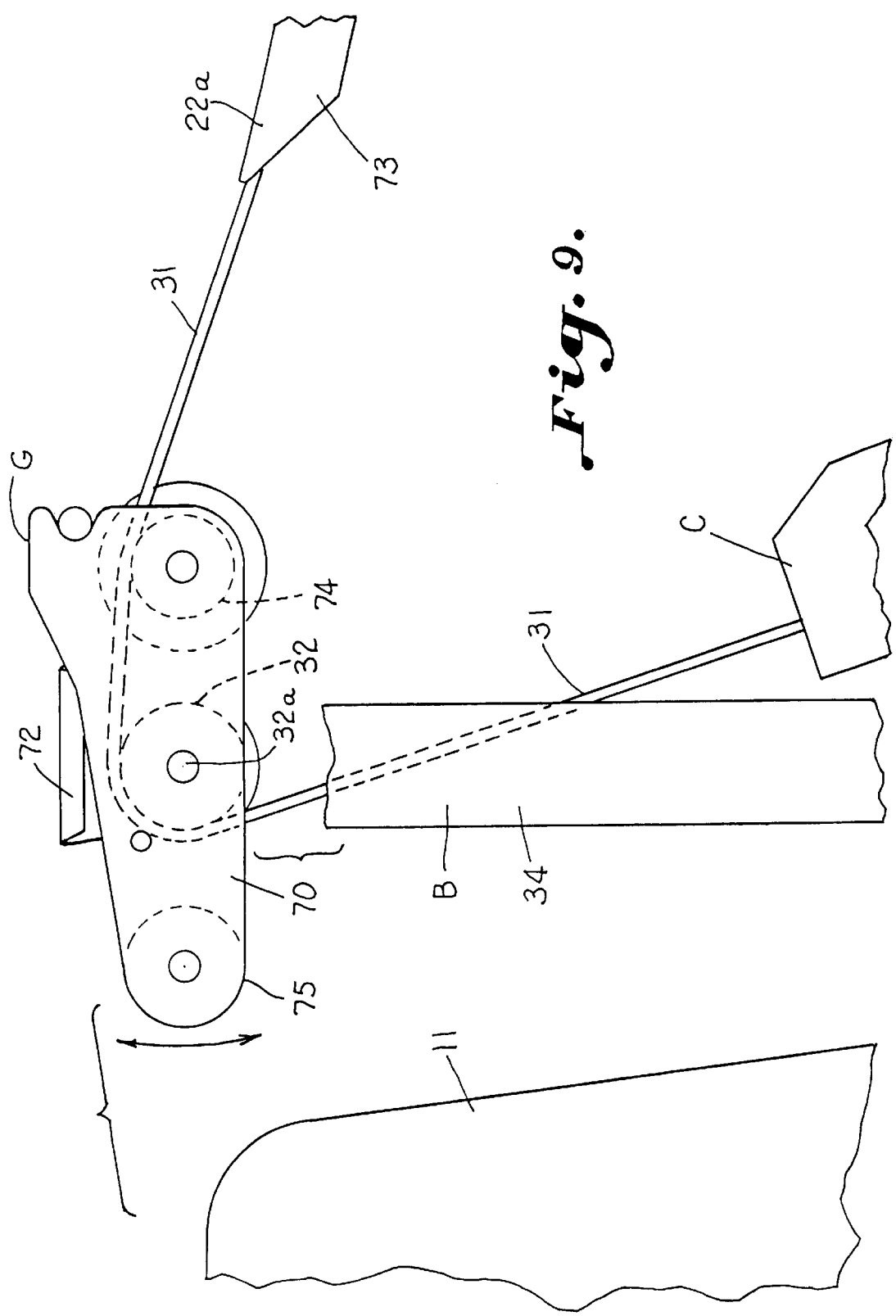
FIG. 9 is an enlarged schematic side elevation further illustrating the rocker arm and locking mechanism for guiding and positioning the trailer for transport.

FIGS. 7–9 illustrate improved apparatus for supporting and positioning an elongated wheeled trailer and its contents for transport above the cab 11 on longitudinal sides 12a and 12b of a carrying compartment 12 of a pickup truck without using cross bracing interfering with access and use of the carrying compartment. A transverse frame member 33 extends between and is fixed at its ends to respective torsion bars adjacent a rear of the cab at a front of the carrying compartment. A pair of transversely spaced longitudinal torsion bars F are each supported by an adjacent side of the carrying compartment as at 49 and adjacent an end of the transverse frame member 33 forming a U-shaped support structure.

The upright support B, includes spaced receptacles 38 and 39. positioning an upright mast upon a medial portion of the transverse frame member 33 for positioning a forward portion of the trailer above the cab 11 (FIGS. 1 and 5).

The mast includes spaced members 34 and 35 for reception by respective receptacles 38 and 39 where in the mast is removably fastened by suitable pins as best shown in FIG. 5 at 38a and 39a, respectively. The winch C is carried therebetween. The members 34 and 35 are preferably constructed from tubing and a sheave 32 is rotatably carried therebetween on a stub shaft 32a (FIG. 9). The rocker arm G is also pivoted at 32a and includes outside bracket members 70. Referring especially to FIG. 8 it will be noted that a pair of spaced receiving members 71 have flanges 72 for automatically locking the trailer on the rocker arm by receiving upturned flanges 73 on the track members 22 and 22a. The members 22a constitute a removable nosepiece which is the first portion of the trailer received by the rotatable guide member E.

The winch cable 31 is illustrated in FIG. 7 as being received between the flanges 73 of the nosepiece 22a and the track 22 from the winch C. From the winch C the cable passes over the sheave 32 and thence over a forward sheave 74 (FIGS. 8 and 9) and thence to the roller E. When the track 22 has been locked into position within the flanges 72, the rear sheave 75 is caused to pivot up as the nosepiece 73 is received and down as the track is pulled into transport position, as indicated by the arrow to accommodate the nosepiece and track. As illustrated in FIG. 8 the track 22 and nosepiece 22a are received so that the flanges 73 bear against spaced supporting sheaves 75 on each side of the sheave 74. Similar supporting sheaves (not shown) may be arranged on each side of the sheave 32.

A pair of longitudinal transversely spaced tracks D are carried by respective torsion bars F on transversely adjustable brackets 49 and 50 positioning respective trailer wheels 13a above the carrying compartment.

The transverse frame member 33 is suitably constructed as to be yieldable for vertical flexing and for resistance to torsional forces intermediate its ends. Thus, the U-shaped support structure may carry the upright support B together with the mast and tracks D for positioning the trailer above the cab and the carrying compartment providing a flexible connection between the truck 10 and the load minimizing stresses upon the sides of the carrying compartment 12 as would otherwise result from uneven pavement and the like during transport, while avoiding transverse bracing as would limit free access to the carrying compartment.

While a preferred embodiment of the invention has been described using specific terms, such description is for illustrative purposes only, and it is to be understood that changes and variations may be made without departing from the spirit or scope of the following claims.

What is claimed is:

1. Apparatus for supporting and positioning a load for transport above a cab on longitudinal sides of a carrying compartment of a pickup truck without the use of cross bracing as would interfere with access and use of the carrying compartment comprising:

a frame member extending transversely between respective said longitudinal sides and being positioned adjacent a rear of said cab at a front of the carrying compartment;

a pair of spaced longitudinal torsion bars each aligned with and adjacent a respective said longitudinal side of the carrying compartment and each having an end adjacent an end of said frame member forming a generally U-shaped support structure;

an upright support carried by a medial portion of said transverse frame member for positioning a forward portion of the load above the cab;

a pair of transversely spaced tracks carried by said torsion bars in longitudinal alignment therewith for positioning the load above the carrying compartment; and said frame member being yieldable for vertical flexing and for resistance to torsional forces intermediate its ends;

whereby said torsion bars and frame member receive stresses which would otherwise be imposed by the load upon the sides of the carrying compartment as a result of bumps from uneven pavement during transport, while keeping bracing between said longitudinal sides to a minimum so as not to limit free access to the carrying compartment by thus imposing a flexible U-shaped support structure between the truck and the load.

2. The structure set forth in claim 1 wherein said upright support includes a pair of spaced receptacles; and a mast comprising a pair of spaced upright members for carrying a winch above the carrying compartment.

3. The structure set forth in claim 2 including a sheave rotatably carried by said mast adjacent a top thereof for carrying a cable from the winch during loading of the load upon the truck.

4. The structure set forth in claim 3 including a rocker arm pivotally carried by said mast on an axis of said sheave; and a roller carried by a leading end of said rocker arm for carrying said cable and for guiding said load into position for transport.

5. The structure set forth in claim 4 including a pair of spaced receiving members having flanges for locking said load on said rocker arm for transport.

6. The structure set forth in claim 3 including a roller mounted on a bracket for receiving said cable from said winch for attachment to said load for use in positioning said load for locking same on the rocker arm.

7. The structure set forth in claim 1 including longitudinally spaced transverse upturned bracket members on said torsion bars for mounting said tracks for transverse adjustment thereon.

8. The apparatus set forth in claim 1 wherein said load includes a trailer having a longitudinal frame member and wherein said pickup truck has a pivoted tailgate including:

an inverted elongated substantially U-shaped rail fastenable beneath said longitudinal frame member;

a detachable nosepiece positionable forwardly of said rail beneath said longitudinal frame member; and a roller carried for rotation on a transverse axis positionable at a rear portion of said tailgate;

whereby a cable extending rearwardly from a winch on the truck may pass over said roller, and thence along said nosepiece and said rail for pulling and guiding said trailer onto said pickup truck.

9. The apparatus set forth in claim 1 wherein said torsion bars include an elongated member having a circular cross section.

10. Apparatus for loading a wheeled trailer for transport above a cab and onto a carrying compartment of a pickup truck comprising:

a mast for mounting a winch above the carrying compartment;

a sheave carried for rotation on said mast above said winch receiving a winch cable on said sheave for pulling said trailer;

a longitudinal receiving member carried by said mast on each side of said sheave having locking flanges for receiving and locking said trailer in position for transport;

a rocker arm pivotally carried by said mast on a transverse axis of said sheave; and a pair of aligned rolls wherein one of said rolls is positioned forwardly and the other rearwardly of said sheave for supporting said trailer in position for transport.

11. A method for supporting and positioning an elongated trailer having transversely aligned wheels and its contents for transport above a cab on longitudinal sides of a carrying compartment of a pickup truck comprising the steps of:

positioning a frame member transversely between respective sides adjacent a rear of said cab at a front of the carrying compartment;

mounting a pair of transversely spaced longitudinal torsion bars on and in alignment with respective sides of the carrying compartment and adjacent an end of the transverse frame member forming a flexible support structure;

mounting an upright support on a medial portion of said frame member for positioning a forward portion of the trailer above the cab; and fixing a longitudinal track on each torsion bar positioning respective wheels above the carrying compartment;

whereby said flexible support structure carries the upright support and tracks for supporting the trailer above the cab and the carrying compartment providing a flexible connection between the truck and the load minimizing stresses upon the sides of the carrying compartment as would otherwise result from bumps caused by uneven pavement during transport, while keeping bracing as would limit free access to the carrying compartment to a minimum.

12. The method set forth in claim 13 including the steps of:

removably positioning a winch upon said upright support; and mounting an arm for rocking motion above said winch for guiding a winch cable for pulling the trailer onto the carrying compartment and positioning a forward portion thereof for transport.

* * * * *